United States Patent [19]

Mills

[11] 4,167,152
[45] Sep. 11, 1979

[54] PLAY APPARATUS FOR LIVE ANIMAL

[76] Inventor: Brendon W. Mills, 9417 Trailhill Dr., Dallas, Tex. 75238

[21] Appl. No.: 871,695

[22] Filed: Jan. 23, 1978

[51] Int. Cl.² .............................................. A01K 1/00
[52] U.S. Cl. ...................................... 119/15; 46/202; 104/138 R; 119/29
[58] Field of Search ....................... 119/15, 17, 18, 29; 46/202, 216, 251; 104/138 R

[56] References Cited

U.S. PATENT DOCUMENTS

| | | | |
|---|---|---|---|
| 3,117,395 | 1/1964 | Einfalt | 46/202 |
| 3,403,634 | 10/1968 | Crowder | 104/138 R |
| 3,682,477 | 8/1972 | Harkins | 119/29 |
| 3,710,509 | 1/1973 | Spiegel | 46/202 |
| 4,027,626 | 6/1977 | De Sousa | 119/15 |

Primary Examiner—Jay N. Eskovitz
Attorney, Agent, or Firm—Richards, Harris & Medlock

[57] ABSTRACT

The specification discloses apparatus for allowing movement of a live animal between spaced apart play areas. An endless track extends between a plurality of spaced apart animal play areas. A vehicle is movable along the track to allow access to the play areas. Structure is responsive to the presence of an animal within the vehicle in order to cause the vehicle to move the animal from one of the play areas to another of the play areas. Structure is provided to terminate movement of the vehicle in the vicinity of the play areas in order to allow the animal to exit the vehicle. When the animal again enters the vehicle, the animal is transported to the next play area.

7 Claims, 3 Drawing Figures

PLAY APPARATUS FOR LIVE ANIMAL

FIELD OF THE INVENTION

This invention relates to pet recreation apparatus, and more specifically relates to apparatus for moving a live animal between spaced apart play areas at the animal's discretion.

THE PRIOR ART

Apparatus has been heretofore known wherein small live pets such as gerbils, hamsters and the like are able to move along plastic tubes and the like between various areas for eating, sleeping and playing. This apparatus has proved popular both with the small pets and their young owners. A need has however arisen for new and improved apparatus with increased living space to provide optimum entertainment for both the pet and for the owner, while allowing the pet to be trained in various endeavors. Such apparatus should alloy the pet to move from area to area at its discretion and should not be dependent upon owner operation, due to the often sporadic presence of many pet owners and due to the nocturnal lifestyle of many pets.

SUMMARY OF THE INVENTION

In accordance with the present invention, a play apparatus for a live pet includes a track leading to at least two animal play areas. A vehicle is movable along the track between the animal areas. Structure is responsive to the presence of an animal within the vehicle in order to cause the vehicle to move from one animal play area to another in order to transport the animal between the animal play areas.

In accordance with another aspect of the invention, apparatus is provided to allow the movement of a live animal between a plurality of spaced apart play areas. A continuous track is provided with a plurality of animal play areas which communicate with spaced points along the track. A wheeled vehicle is operable to move in one direction around the track. The vehicle includes a motor causing movement of the vehicle. A door is provided to allow entrance of the animal into the vehicle when the vehicle is stationary adjacent one of the play areas. Circuitry is responsive to the presence of the animal within the vehicle causing movement of the vehicle along the track. Structure is adjacent each of the play areas to cause termination of movement of the vehicle proximate to the play area. Structure is provided to lock the door to the vehicle to prevent exit of the animal from the vehicle when the vehicle is in motion. Structure is provided to unlock the door of the vehicle to allow exit of the animal from the vehicle when the vehicle is stopped adjacent one of the play areas.

DESCRIPTION OF THE DRAWINGS

For a more detailed description of the present invention and for further objects and advantages thereof, reference is now made to the following description taken in conjunction with the accompanying drawings, in which.

DETAILED DESCRIPTION OF THE PREFERRED EMBODIMENT

Figure 1:
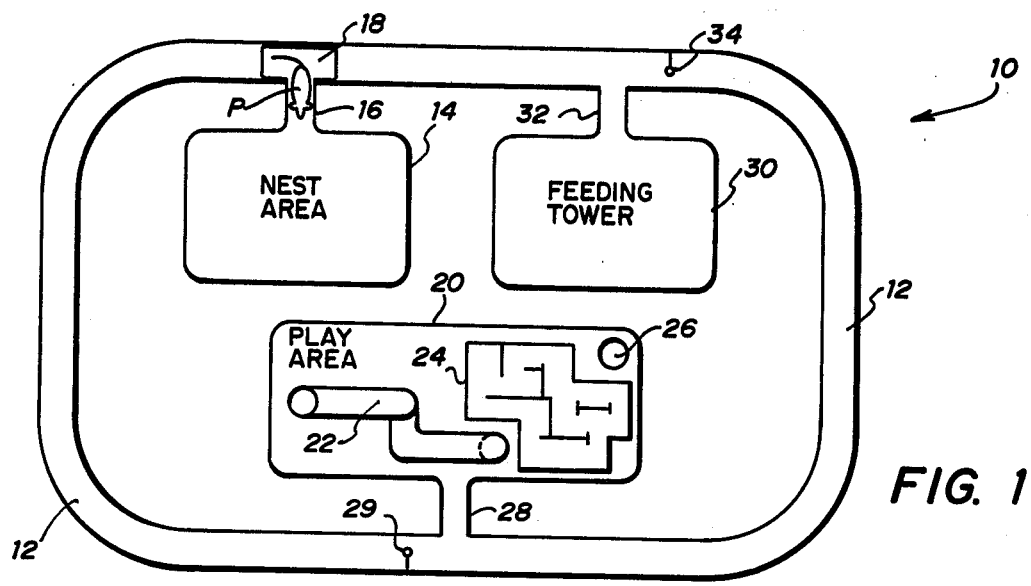
FIG. 1 is a somewhat schematic diagram illustrating a top of an endless track and vehicle movable along thereof between various animal play areas.

Referring to FIG. 1, a somewhat diagrammatic illustration of a typical embodiment of the present animal play apparatus is illustrated generally by the numeral 10. The apparatus 10 includes an endless track 12 which encircles three enclosed animal play areas disposed at spaced apart locations along the track 12. A nest area 14 comprises an enclosed area in which nesting materials may be disposed. A tubular entrance 16 extends from nest area 14 to the edge of the track 12. The end of the tubular entrance 16 is open to allow entrance and exit of the pet from the nest area 14.

A vehicle 18 is movable around the track 12 in a predetermined direction and is operable to stop at each animal play area. When the vehicle 18 is parked in front of the tubular entrance 16, a pet which is generally identified by the letter P may enter the nest area 14 from the vehicle 18. The pet may be a hamster, gerbil, white rat or any other pet. The pet may subsequently leave the nest area 14 and enter the vehicle 18 through tubular entrance 16. When the pet enters the vehicle 18 from the nest area 14, the vehicle 18 is energized and moves around the track 12 to a play area 20. Play area 20 comprises an enclosed area which contains a plurality of games such as a tube 22, a maze 24 and a play ball 26. It will, of course, be understood that various and sundry other playthings may be located within the play area for the enjoyment of the pet and according to the various desires of the pet. The play area 20 is completely enclosed by wire or plastic to prevent escape of the pet, with the exception of a tubular entrance 28 which extends to an area adjacent the track 12. The end of tubular entrance 28 is open to enable access to the vehicle 18.

A stop projection 29 is provided in the middle of track 12 to stop movement of the vehicle 18 when vehicle 18 is adjacent the tubular entrance 28 to allow the pet P to enter the play area 20. As will be subsequently described, the vehicle door is locked during movement of vehicle 18 to prevent escape of the pet when the vehicle 18 is between play areas. When the pet P enters the vehicle 18 from the play area 20, the vehicle 18 is again energized and moves around the track 12 to a feeding tower area 30. Feeding tower area 30 is enclosed and contains a plastic tower with food in the top thereof. The feeding tower 30 includes a tubular entrance 32 disposed adjacent the track 12 to enable the pet P to enter the feeding tower 30 from the vehicle 18. A stop member 34 is provided to cause the vehicle 18 to stop adjacent the feeding tower 30.

When the vehicle 18 stops adjacent the feeding tower 30, the pet P may enter the tublar entrance 32 and climb the feeding tower in order to obtain food and water. When the animal leaves the feeding tower 30 and enters the vehicle 18 through tubular entrance 32, the vehicle 18 begins to move and is stopped adjacent the nest area 14 in the illustrated position in order to allow the pet to enter the nest area 14 when he desires.

Figure 2:
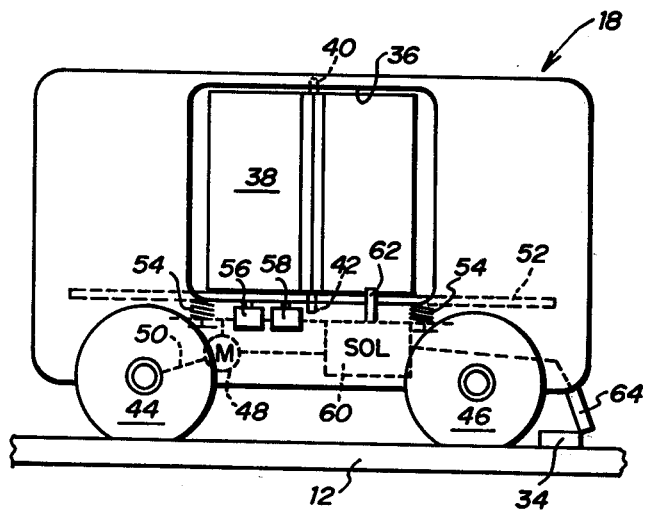
FIG. 2 is a side view of the vehicle of the present invention.

FIG. 2 illustrates a side elevational view of the vehicle 18. A door 36 is formed in the side of the vehicle 18. The opposite side of the vehicle 18, not shown, comprises a solid wall such that the animal P may enter and exit the vehicle 18 only through door 36. A revolving door 38 is pivotally mounted about pivots 40 and 42 to rotate to allow the animal P to enter and exit the vehicle 18 through door 36. Wheels 44 and 46 are mounted underneath the vehicle 18 and engage the track 12 to carry the vehicle 18 about the track. Wheels 14 are moved in response to energization of a motor 48. Motor 48 is connected by suitable gearing and drive structure 50 in order to rotate wheels 44.

An important aspect of the present invention is the provision of a platform 52 which serves as the floor for the vehicle 18 and also serves to detect the weight of the animal P. When the animal enters the vehicle 18 through the revolving door 38, the weight of the animal P on the floor 52 causes a slight depression of the floor 52. Floor 52 is vertically spring loaded by four springs 54 located under the quadrants of the platform.

A pair of microswitches 56 and 58 are located beneath the platform 52 and sense the vertical up and down movement of the platform 52 in order to sense the presence or absence of an animal P within the vehicle 18.

A solenoid 60 is located in the bottom of the vehicle 18 and includes a movable plunger 62. In the illustrated energized position, the plunger 62 extends to block movement of the revolving door 38. In the retracted position of the plunger 62, movement of the revolving door 38 is unimpeded in order to allow the animal to enter or exit the vehicle 18. A switch arm 64 is disposed beneath the rear of the vehicle 18 and is dimensioned to sense the presence and absence of the stop projections 29, 30, 34 and the like. The motor 48, microswitches 56 and 58, solenoid 60 and switch lever 64 are interconnected in an electrical circuit with a battery, which will be subsequently described with respect to FIG. 4, in order to control the movement and stopping of the vehicle 18.

Figure 3:
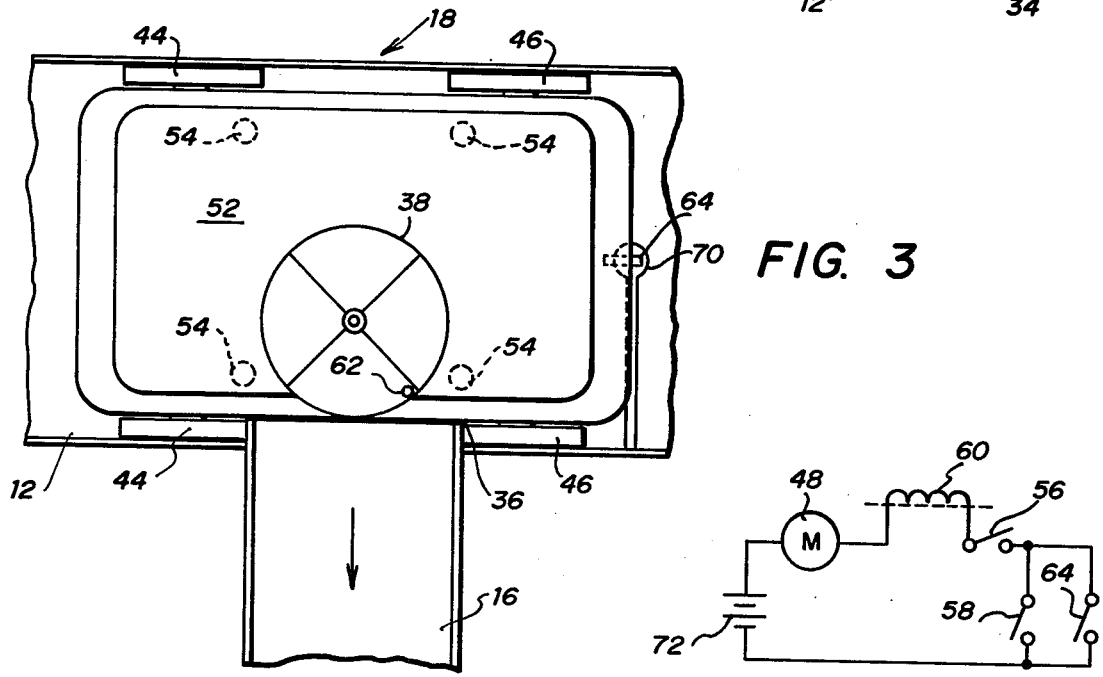
FIG. 3 is a top view of the present vehicle with the upper portion removed for clarity of illustration.

Referring to FIG. 3, a top view of the vehicle 18 is illustrated, with the top portion thereof removed for clarity of illustration. FIG. 3 illustrates the engagement of the wheels 44 and 46 with the track 12 and illustrates the cooperation of the tubular entrance 16 with the door 36 formed in the vehicle 18. The revolving door 38 is illustrated which enables the entrance and exit of the animal from the vehicle 18. The plunger member 62 is illustrated in the manner such that it prevents rotation of the revolving door 38. The revolving door 38 is structured to be rotated only in one direction. FIG. 3 also illustrates the placing of the four springs 54 at the quadrants of the platform 52 which senses the presence of the animal within the vehicle 18. FIG. 3 also illustrates the cooperation of the switch lever 64 with a stop projection 70 in order to sense the location of the tubular entrance 16.

Figure 4:
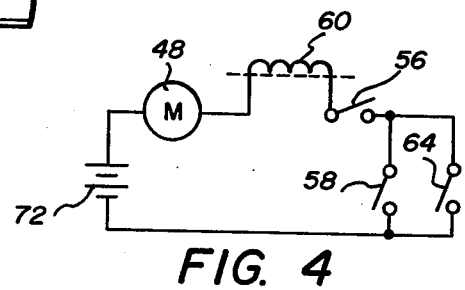
FIG. 4 is a schematic diagram of the electrical control circuitry of the present invention.

FIG. 4 illustrates in schematic detail the electrical control circuit of the present invention. A battery 72 is connected at a terminal to one terminal of the motor 48. The second terminal of the motor 48 is connected to one terminal of the solenoid coil 60. The opposite terminal of the solenoid 60 is connected to one terminal of the microswitch 56. The other terminal of microswitch 56 is connected to one terminal of the switch actuated by the switch lever 64. The other terminal of the switch lever 64 switch is connected to the second terminal of the battery 72. Microswitch 58 is connected in parallel with switch 64.

In operation of the circuit shown in FIG. 4, it will be assumed that the vehicle 18 is at rest adjacent the nest area 14. Microswitches 56 and 58 are open and switch 64 is open due to stop projection 70. Motor 48 and solenoid 60 are thus deenergized. If the animal P desires to leave the nest area 14, it exits through the tubular entrance 16 and moves through the revolving door 38 to inside the vehicle 18. The weight of the animal P causes the platform 52 to be depressed, thereby energizing the microswitches 56 and 58. The microswitch 58 is of the momentary energization type and reopens after a predetermined short time interval after being closed.

The closing of the switches 56 and 58 causes electrical current to flow through the motor 48 and the solenoid 60, thereby causing the vehicle to move and the door 38 to be locked by plunger 36. After a short interval, the switch lever 64 is closed due to the passage of the vehicle 18 past the projection 70. Shortly thereafter, the microswitch 58 becomes open. Due to the closed circuit through closed switches 56 and 64, the vehicle 18 continues to move until the switch arm 64 hits against the projection stop 29 and again becomes an open circuit. This causes the motor 48 to be deenergized and the vehicle 18 stops adjacent the tubular entrance 28.

During passage of the vehicle 18 between nest area 14 and play area 20, the solenoid 60 is energized, thereby extending the plunger 62 upwardly in order to block further rotation of the revolving door 38, thereby preventing escape of the animal P from the vehicle 18. When the vehicle 18 is stopped, the solenoid 60 is deenergized, thereby removing the plunger 62 from engagement with the revolving door 38 and allowing the pet P to exit the vehicle 18 and to enter through the tubular passageway 28 into the enclosed play area 20. When the animal desires to leave the play area 20, it merely enters the vehicle, thereby causing the vehicle to become energized and to move the animal P to the feeding tower 30. When the animal desires to leave the feeding tower 30, it is moved by the vehicle to the nest area 14.

The present apparatus thus enables the pet to determine its desired location and provides the owner and the pet with a substantial amount of enjoyment and education.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. Apparatus to allow the movement of a live animal between a plurality of spaced apart play areas comprising:
   a continuous track,
   a plurality of animal play areas communicating with spaced points of said track,
   a wheeled vehicle operable for moving in one direction along said track,
   motor means contained in said vehicle for causing movement of said vehicle,
   means for allowing entrance of the animal into said vehicle when said vehicle is stationary adjacent one of said play areas,
   means responsive to the presence of the animal within said vehicle for energizing said motor means to cause movement of said vehicle along said track,
   means adjacent each of said play areas for causing termination of movement of said vehicle proximate to said play area, means for preventing exit of the animal from said vehicle while said vehicle is in motion, and means for allowing exit of the animal from said vehicle when said vehicle is stopped adjacent one of said play areas.

2. The apparatus of claim 1 and further comprising:

means for sensing the weight of the animal within said vehicle for actuating said motor.

3. The apparatus of claim 1 and further comprising:

stop means located adjacent each of said play areas for causing termination of the movement of said vehicle by deenergizing said motor.

4. The apparatus of claim 1 wherein one of said play areas comprises a feeding area.

5. The apparatus of claim 1 wherein one of said play areas comprises a nesting area.

6. The apparatus of claim 1 wherein one of said play areas comprises an area with a plurality of games therein to entertain the animal.

7. Apparatus to allow the movement of a live animal between a plurality of spaced apart play areas comprising:

a continuous track, a plurality of animal areas communicating with spaced points of said track, a vehicle operable for moving along said track to pass each of said animal areas, motor means for causing movement of said vehicle, means for allowing entrance of the animal into said vehicle when said vehicle is stationary adjacent one of said play areas, means responsive to the presence of the animal within said vehicle for energizing said motor means to cause movement of said vehicle along said track, means adjacent each of said play areas for causing termination of movement of said vehicle proximate to said animal area, means for preventing exit of the animal from said vehicle while said vehicle is in motion, and means for allowing exit of the animal from said vehicle when said vehicle is stopped adjacent one of said play areas.

* * * * *